(12) United States Patent
Kearsley

(10) Patent No.: US 8,388,714 B2
(45) Date of Patent: Mar. 5, 2013

(54) BAG FILTRATION SYSTEM FOR A FORCED AIR FURNACE

(76) Inventor: Douglas I. Kearsley, Morgan, UT (US)

( * ) Notice: Subject to any disclaimer, the term of this patent is extended or adjusted under 35 U.S.C. 154(b) by 0 days.

(21) Appl. No.: 13/135,342

(22) Filed: Jul. 2, 2011

(65) Prior Publication Data
US 2013/0000264 A1    Jan. 3, 2013

(51) Int. Cl.
*B01D 46/02* (2006.01)
(52) U.S. Cl. ............... 55/378; 55/483; 55/484; 55/478; 55/480; 55/481; 55/506
(58) Field of Classification Search .............. 55/378, 55/491, 493, 497, 500, 511, 495, 490, 521, 55/DIG. 12, DIG. 31, 481, 483, 484, 478, 55/480, 506
See application file for complete search history.

(56) References Cited

U.S. PATENT DOCUMENTS

| | | | | |
|---|---|---|---|---|
| 4,197,099 A | * | 4/1980 | Lundberg | 55/378 |
| 5,914,413 A | * | 6/1999 | Andersson et al. | 55/378 |
| 6,451,079 B1 | * | 9/2002 | Lange et al. | 55/379 |
| 7,186,287 B2 | * | 3/2007 | Beier | 55/483 |

\* cited by examiner

*Primary Examiner* — Duane Smith
*Assistant Examiner* — Minh-Chau Pham
(74) *Attorney, Agent, or Firm* — M. Reid Russell

(57) ABSTRACT

A bag filtration element and system for its installation in a forced air furnace where the filtration element includes a channel element frame that receives rectangular bag frames fitted thereto that each received an open bag neck end fitted thereto, and the rectangular bag frames are fitted side by side into the channel element frame, whose upper end closes the frame into a rectangle, and, the bag ends are folded around the bag frames sides and connected. A rectangular opening is formed into the plenum of a furnace inlet air duct to extend, at an upward angle, across the rectangular opening, between opposing inner walls of the air duct, and a door is provides for positioning over the duct rectangular opening with the bag filtration element installed therein.

9 Claims, 7 Drawing Sheets

BAG FILTRATION SYSTEM FOR A FORCED AIR FURNACE

BACKGROUND OF THE INVENTION

1. Field of the Invention

This invention relates bag filters and their mountings for filtering return air of a forced air furnace system, with the return air duct as the housing for the system.

2. Prior Art

Return air filters for residential and commercial forced air heating and cooling units have traditionally been installed in the transition between the air handler and the termination of the return air duct. This tradition is typically a one inch filter rack installed between the air handler and the end of the duct, or inside the air handler, or some higher efficiency filters supply their own housing to hold their filter, which is installed between the air handler and the termination of the return air duct, which requires modification of the duct to allow for the housing to fit into the system.

Return air filters for residential and commercial forced air furnaces have traditionally employed square or rectangular filters having an outer frame formed from cardboard, or the like, that hold an air filtration material, such as fiber glass, or a more efficient material, across the frame. Some higher efficiency filters have been developed which are four to twelve inches thick, using material that is pleated from one inch to six inches and require major adapting of the return air duct in order to use these types of filters. Where such filter material is efficient for removing particles from an air flow, including some very small particles, it is less efficient and useful than the filter material preferred for the invention, as has been developed for use as the bag material of the invention that is known as a high efficiency bag air filter (HEBA™) that effectively removes particles from the inlet air flow to an air handler and has more surface area in the filter, without clogging as quickly as filters of less surface area could experience. In practice, the filter material of the invention has been found to last longer than conventional filters because of the increased surface area of the filter.

Previous higher efficiency furnace filters have required the modification of the return air duct of the heating and cooling system. The invention can be easily installed from the front of the duct by cutting a single hole in the duct, installing an access door onto the outside of the duct and a rail inside the duct for the filter assembly to rest on and the other side of the assembly rests against the opposite side of the duct. Thus, eliminating the need for extensive and expensive remodeling of the return air duct.

Unlike earlier filtration arrangements that employ flat elements or pleated filter media, the air filter system of the invention provides the inner surface of each of an optimum number of bags for the furnace duct interior dimensions as the air engages surfaces. Accordingly, the filter system provides an improved capacity for return air filtration over a longer period of time than has been possible utilizing a single flat filter only or even a pleated type filter. Where, of course, bag filters have been in use in industrial applications, such as power plants, they have not been incorporated into residential furnace systems. Nor have such earlier uses involved a unique and practical bag mounting and installation system like that of the invention.

SUMMARY OF THE INVENTION

The invention is in a bag filtration system for installation into the existing return air duct of a residential and commercial air handler so that the bags hang down inside the duct, using the existing duct as the housing for the filter. The individual bags are preferably manufactured from high efficiency materials to provide a high efficiency bag air filter (HEBA™) for installation in the cold air return duct of a conventional residential heating cooling system. The filtration systems are identical and are sized appropriately for a particular furnace application. The filter is made up of several individual bags and frames, which are connected together with staples and are fitted into a U-channel frame. To form the individual bag filter element, the neck of a filter bag is drawn through or over a rectangular shaped four sided bag frame. The filter assembly is placed into the cold air return duct and rests on a support, which is installed on one of the sides of the return air duct and the filter rests against the other side of the duct at an approximate angle of 45 degrees above the bracket. The angle of the filter will vary depending on the size of the duct it is installed in. The return airflow is directed into the bags open neck ends.

Identical bags are used for the filter element that are sized to fit within the bag frames whose dimensions are selected to, when fitted side to side in the element frame form the filter element that is for fitting across the return air flow duct.

A conventional home or commercial forced air furnace return air duct is fitted to receive the bag filter system of the invention by first taping a template onto the return air duct in the desired location for the door, preferably in the front of the duct. The pilot holes of the template are drilled out and the area for the opening in the duct is marked. A rectangular hole is then cut in the duct outer wall, preferably, in the front of the duct. The sides, top and bottom of the door frame are then secured to the duct with rivets and thus making the opening to the duct smooth and free of sharp edges. A bracket is attached to the inner wall of the duct on one side of the duct with rivets. The element frame thereby rests on the bracket and fits snugly between the filter support and the opposite duct wall. The door is placed into the door frame, which causes a tight seal around the duct and opening. Additionally, sealing strips may be attached, as needed, to the filter assembly sides to seal the filter on all sides against the walls of the duct.

With the bags and bag frames installed, one side of the U-shaped channel element frame is bent at a notch to where the frame ends contact and are fastened together, as with a pop rivet, closing the element frame into a rectangle that contains the stack of bags frames and bags. The bag neck ends are folded over the bag frames and are secured, as by stapling, through the bags necks or through the bag necks and bag frames and, as needed the end bag frames can be secured to the element frame ends as with clips. So arranged, the bags and bag frames are secured together with the bags open neck ends positioned across the a return air flow that passed through the furnace return duct.

A conventional home or commercial forced air furnace return air duct is fitted to receive the bag filter system of the invention by first cutting a rectangular opening in a duct outer wall, preferably, with the long leg of the rectangular opening parallel to the duct longitudinal axis, and, with the opening formed to accommodate the element frame of the invention mounting the bags and bag frames that are rotated into the opening. The element frame ends are seated on an element support that has been secured to an interior side of one of the opposing duct interior walls, and the bags are allowed to unfold under the element frame. So arranged, the bags openings will essentially fill the duct interior. A cover is formed to fit over the formed opening, sealing the duct. The element frame thereby fits snugly between the element support and the opposite duct wall. Additionally, sealing strips may be attached, as needed, to the element frame sides under surface for engaging, respectively, the element support and opposite duct wall and a cover fitted over the rectangular opening.

In practice, a preferred bag material for forming the individual filter bags of the invention is one selected to have a high efficiency bag air filter (HEBA™) that will effectively remove particles from the return air flow to a furnace. The bag filter material of the invention as selected has been found to achieve a minimum efficiency rating value (MERV) of MERV 11 and thereby qualifies as an effective and efficient air cleaner, with, due to the increase in filter area as provided by the bags as compared to flat or pleated filters, the filter element of the invention can last up to a year without replacement for most furnaces. However, the invention may use filtering materials of higher or lower MERV ratings.

It is a principal object of the invention to provide a bag filter element frame that mounts multiple bags such that the bag openings for installation across a furnace return air duct such that the bags hang in the duct to receive the furnace inlet air to effectively and efficiently remove dust, pollen, and other particles from that inlet air flow.

Another object of the invention is to provide a bag filter system for retrofitting into a return air duct of a conventional residential or commercial forced are furnace to receive a filter element frame mounting open filter bags maintained in bag filter frames as the filter element of the invention.

Another object of the invention is to provide rigid bag frames as bag supporting components to receive the bag necks that are each fitted to an individual bag frame, with the bag frames then connected into a rigid element frame, stacking the bag frames edge to edge within the rigid element frame, with the folded bag necks to cover the junctions of the bag frames sides and said bag necks are secured together, as by stapling through the bags necks and, as required to strengthen the connection through the adjacent bag frame sides, securely coupling the bags necks to the bag frames and to each other, to support the force of the air flow through the furnace inlet duct and the weight of the collected materials in the bags.

Still another object of the invention is to provide bags of a bag filter element that will support materials collected in the bags over time of operation for as much as a year to efficiently clean a furnace inlet air flow.

Still another object of the invention is to provide a bag filter element frame for mounting the individual bags that is for installation into a furnace return duct that is easy to install and remove and includes a door for fitting over a rectangular opening formed through the return duct wall, into the duct plenum, that the bag filter element frame and mounted bags are fitted through and including an element support on the duct side wall that the element frame end is supported on.

DESCRIPTION OF THE DRAWINGS

The invention may take form in the arrangement of component parts that are herein shown as preferred embodiments and will be described in detail and illustrated in the accompanying drawings which form a part hereof.

DETAILED DESCRIPTION

Figure 1:
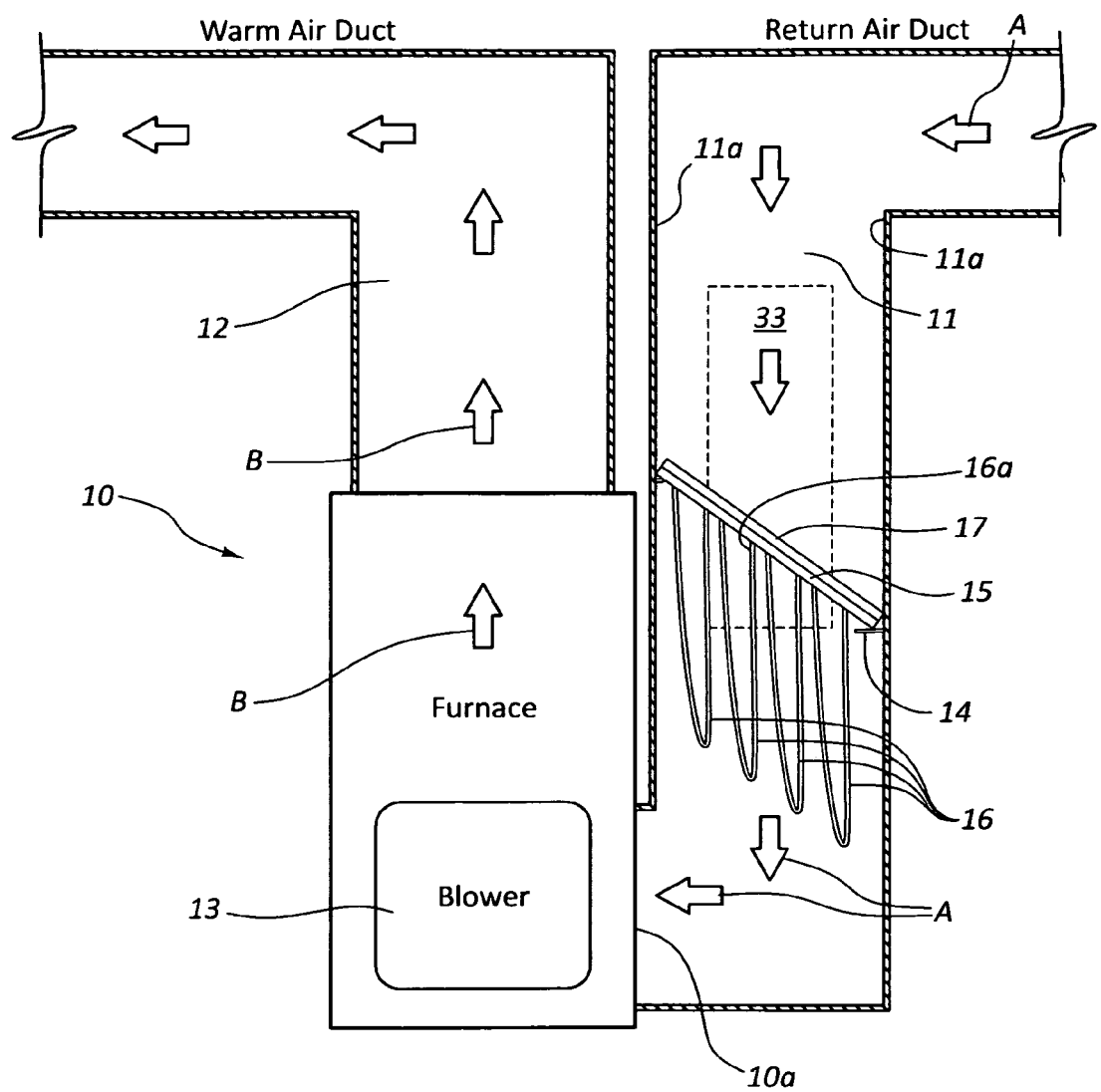
FIG. 1 shows a side elevation schematic view of a residential furnace with inlet and outlet ducts with a bag filter element of the invention shown installed in the furnace inlet duct, showing the element frame sides positioned on an element support that is secured onto one of the duct opposing interior surfaces such that the element frame slopes at an upward angle to the inlet air flow, as illustrated by arrows A.

FIG. 1 shows a representation of a forced air furnace 10, hereinafter referred to as furnace, having an air inlet, or cold air return, and outlet ducts, 11 and 12, respectively. Arrows A represent air being pulled into the furnace by a blower 13, that heats air in the furnace and pushes that heated air, shown as arrows B, that travels through the outlet duct 12 to heat a dwelling. Earlier air filtration systems have generally employed flat rectangular filter elements that have been positioned across a furnace air inlet 10a, usually by sliding that filter element into a narrow opening, through the duct adjacent to the air inlet 10a. Such flat filters have provided dust collection to an inlet air flow whose effectiveness is governed by the surface area across the filter element. Recently, a number of flat waffle filter elements have come into common use with the peaks and valleys of the waffle surface providing an increase in the filter surface area of approximately fifty percent over comparable flat filters of the same dimensions. Neither the conventional flat or waffle filter elements are appropriate for efficient air filtration for much over one to three months. Whereas, a bag filter element 15 of the invention that is shown installed on element support 14 in the cold air return duct 11 provides multiple bags 16 that are each open at its neck 16a and are hung side by side across a filter element frame 17 that are open across the cold air return duct 11. The respective bag 16 necks 16a are fitted together, in side by side relationship, with their necks 16a open to the cold air flow. So arranged, the entire interior surface of each bag provides a dust removal surface that, in practice is ten to fifteen times larger in surface area than that of a flat element and, accordingly, will last much longer before replacement than is possible with prior flat filter. In practice, the bag filter element 15 has been found to efficiently remove dust particles from a cold air flow for up to one year.

Figure 2:
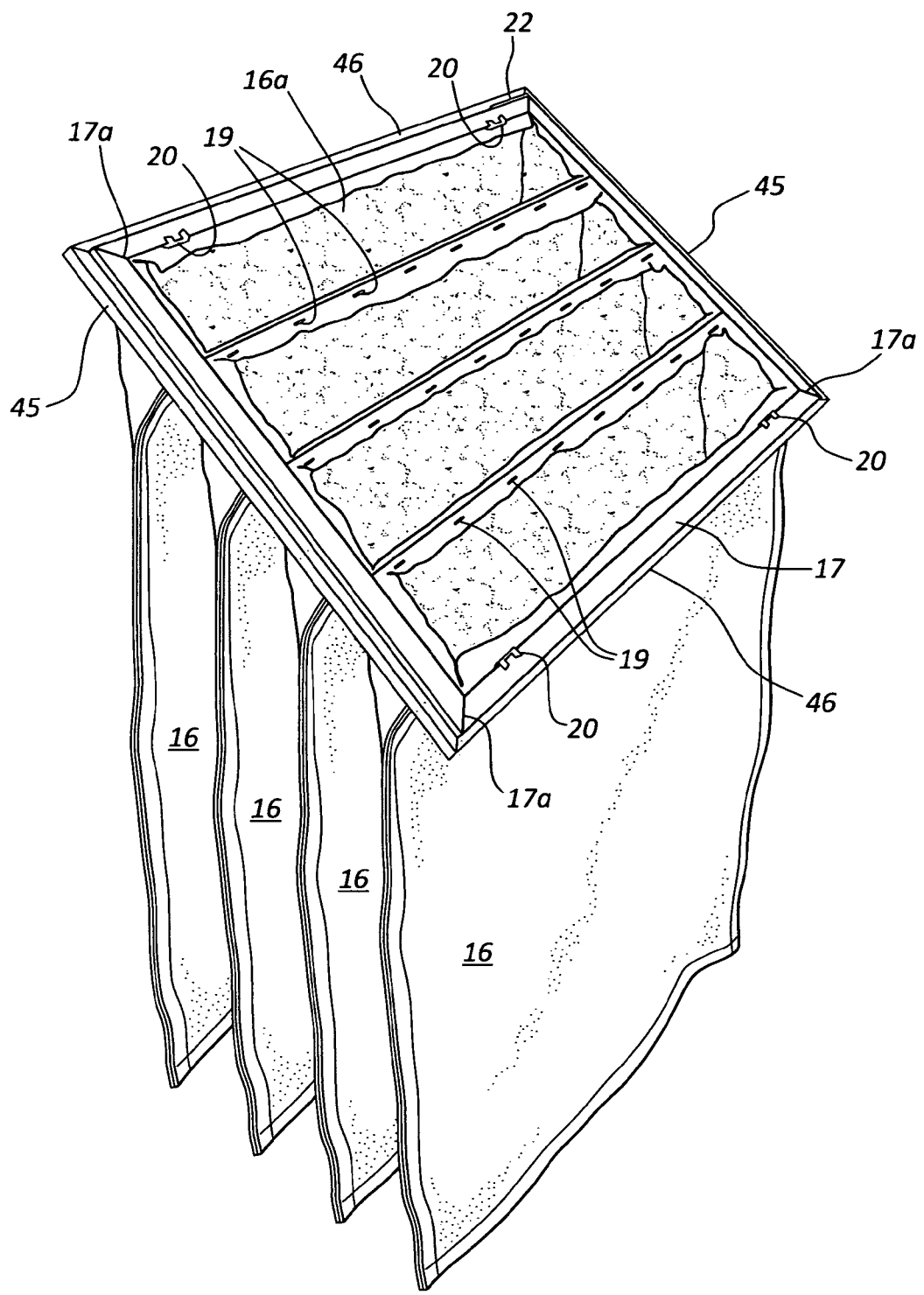
FIG. 2 shows a perspective view of the element frame formed from a straight section of channel into a rectangular shape, closing off the ends thereof after installation of rectangular bag frames stacked upon one another.
Figure 4A:
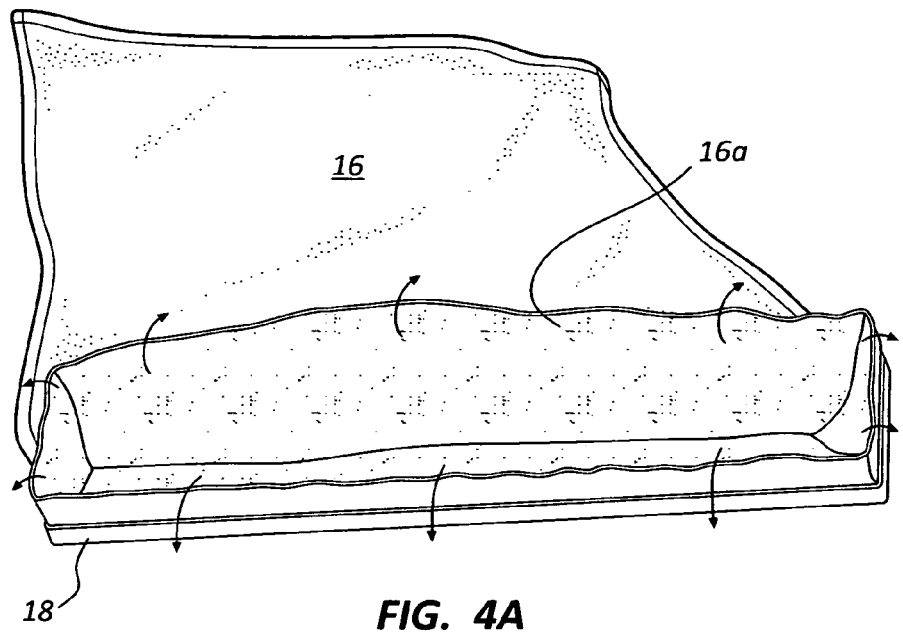
FIG. 4A shows a perspective view of a bag frame and bag, showing a bag neck pulled up through the frame open interior to be folded upon itself as illustrated by curved arrows.
Figure 4B:
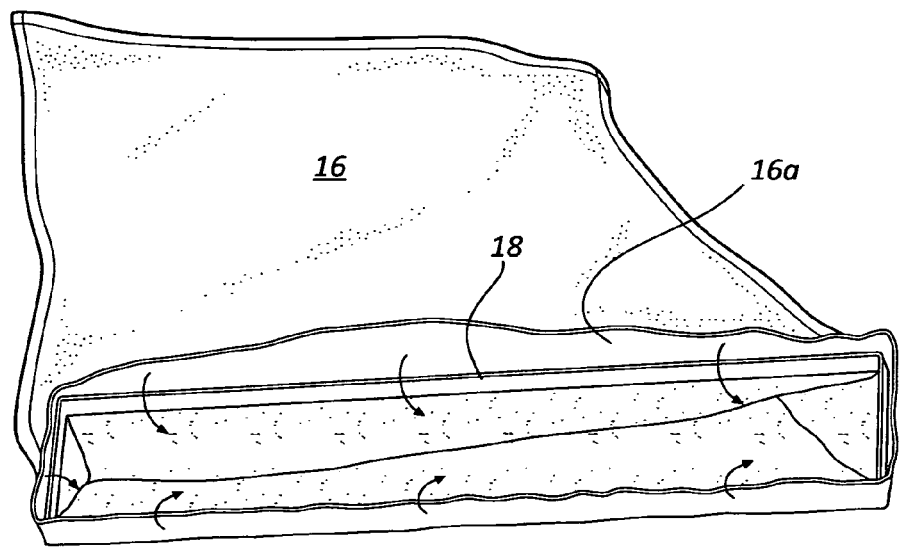
FIG. 4B shows a view like that of FIG. 4A only showing the bag neck pulled over the outside of the bag frame to be folded upon itself as illustrated by curved arrows.

To provide efficient particulate removal each bag is preferably formed from a mat of randomly arranged fibers that are selected to provide a high efficiency bag air (HEBA™) filter for installation in the cold air return duct 11 of a conventional home furnace 10. The individual bags 16 of the bag filtration system are identical, and are sized appropriately for a particular furnace configuration. In practice, three or more filter bags 16 and three or more bag frames 18 are fitted side by side in the element frame 17, and each bag 16 is preferably from twenty four to thirty six inches in length, depending upon the configuration of the cold air flow duct 11. FIGS. 1 and 2 show a use of four bags 16 that are each mounted to a bag frame 18. Shown in FIGS. 4A and 4B, each bag 16 neck 16a can be pulled through the bag frame 18 open center, with the bag neck folded over the frame, as shown by the arrows in FIG. 4A, or the bag 16 neck 16a can be pulled over the bag frame, with the bag neck folded into the bag frame 18, open center, as shown by the arrows in FIG. 4B, within the scope of this disclosure. It should be understood that the bags 16 can be joined to the bag frames 18 by folding and stapling arrangements, and that fasteners other than staples can be used to secure the bags 16 necks 16a to the bag frames 18, within the scope of this disclosure.

Prior to bag 16 neck 16a folding and fastening to each bag frame 18, the bag frames 18 are positioned into the element frame 17, that is preferably a channel, and thereafter the bags 16 bag necks 16a are folded over the bag frame sides and, preferably, are stapled in place. Each bag frame 18 is thereby positioned adjacent to and along side another, filling the element frame 17 from bottom to top. Clips 20 can be used for securing the top and bottom end bag frames 18 within the element frame, as shown in FIG. 2, that are installed to hold the bag frame 18 sides to the ends of the element frame 17.

Figure 3:
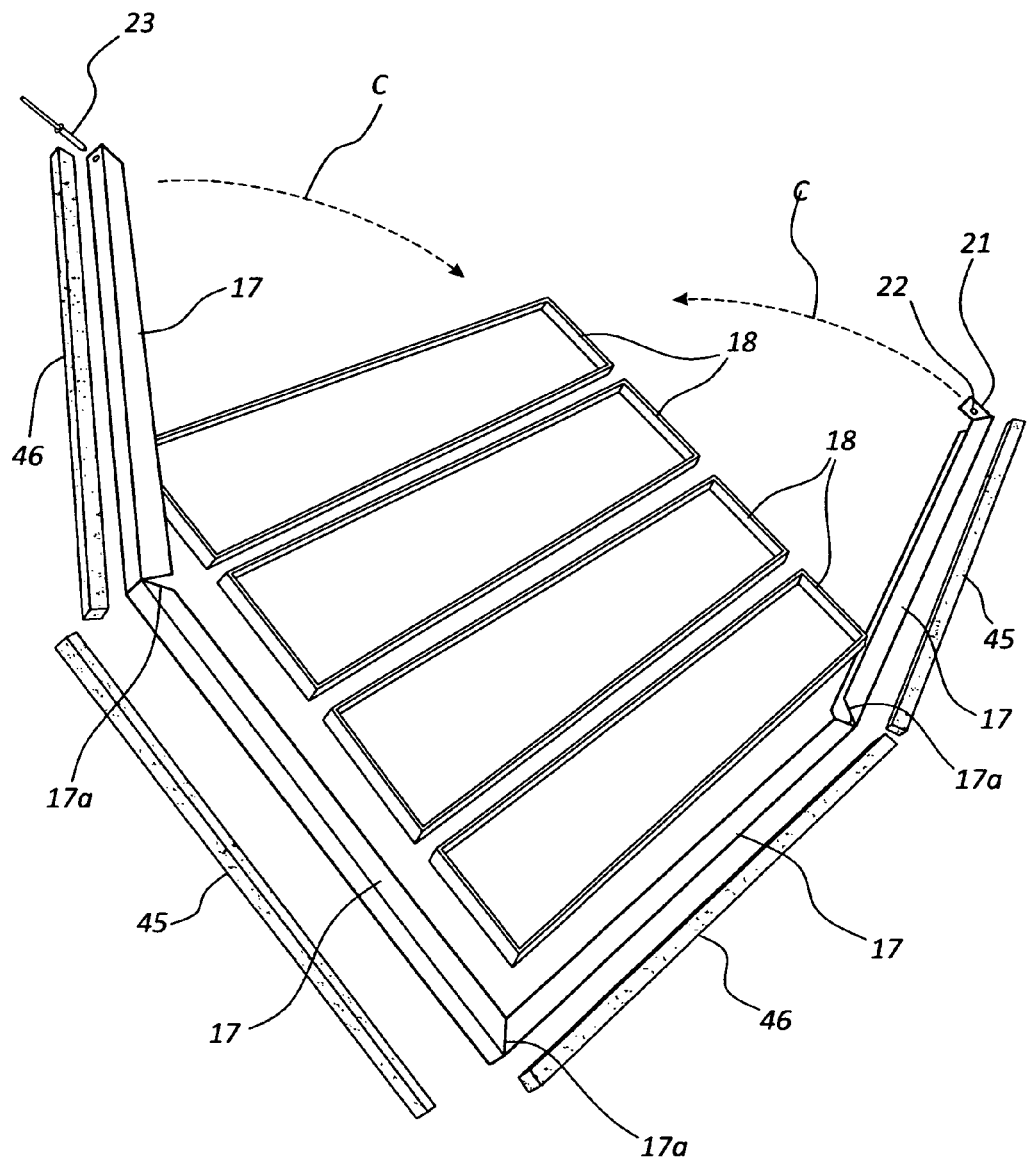
FIG. 3 shows a side elevation perspective view of an element frame that is open at side and top end to fit bag frames side by side therein and showing optional sealing strips aligned for mounting onto to the element frame sides and ends.

The element frame 17, shown in FIGS. 2 and 3, is preferably formed from a straight section of channel that is notched at intervals 17a to be bent at a right angle to form a rectangular shape with the channel sides facing one another across their long and short sides. Shown in FIG. 3, the element frame 17 is a rectangle with an open top end, and the bag frames 18 the bags 16 neck ends 16a are fitted through the bag frames, as set out above. The bag frames 18 are installed, as shown in FIG. 3, and the bags 16 necks 16a are maintained to the bag frame sides and ends by an installation of staples through the necks and frame sides and ends, completing the bag and bag frame assembly and installation in the element frame 17. Whereafter, the element frame top end portion is bent, as shown in FIG. 3 at arrow C, to contact the opposite element frame end. For maintaining the element frame 17 ends together, a tab 21 is secured across the element frame side end that has a center hole 22 that is to receive a pop rivet 23 fitted therein that is drawn so as to expand the rivet end, riveting the element frame top and side ends together, completing the element frame 17 assembly.

Figure 6:
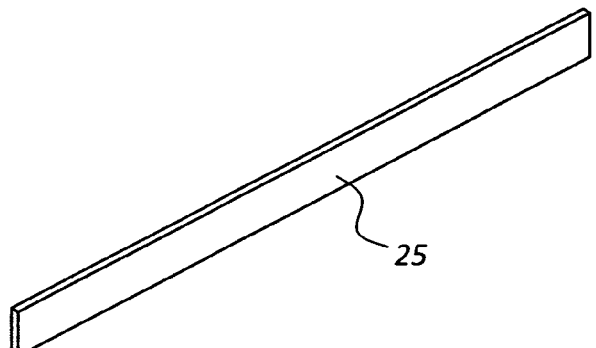
FIG. 6 shows a profile perspective view of a section of a first embodiment of the bag frame as formed from rectangular bar before it is bent into a rectangle.
Figure 7:
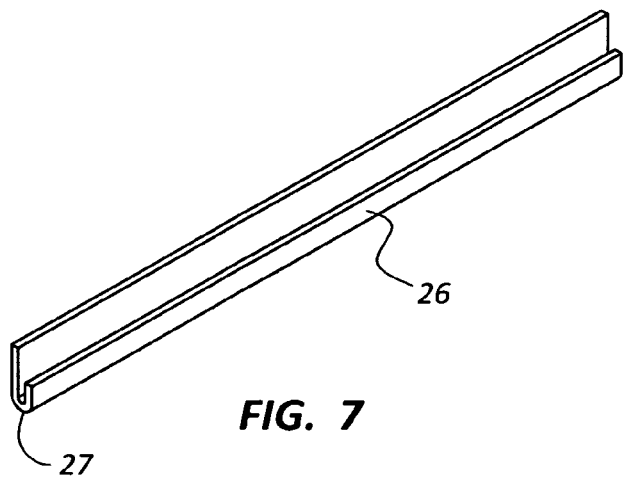
FIG. 7 shows a view like that of FIG. 6 of a second embodiment of the bag frame as formed from J bar before it is bent into a rectangle.
Figure 9:
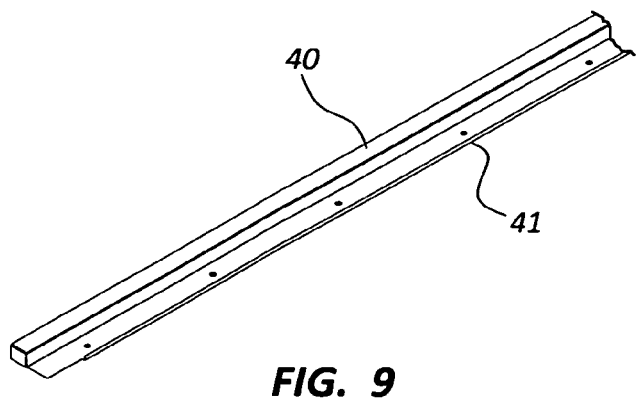
FIG. 9 shows a side elevation perspective view of a section of a rail for mounting onto the templet of FIG. 8 for forming rails around the rectangular opening.

As set out above, the folded bag 16 neck ends 16a are preferably held to the bag frame 18 sides and ends by installing staples 19 through the sandwich of bag neck ends 16a and bag frame 18 sides and ends. Over time with use the bags is use removing particles from a furnace inlet air flow, the bags 16 will each collect and hold a weight of dust particles, increasing the load on the bag that will act on the bag couplings to the bag frame. In practice, to support such weight and load increase, the bag frame 18 is preferably formed from a light gauge galvanized steel flat bar 25, as shown in FIG. 6, that is bent into the rectangular shape with the contacting ends secured together, with connectors, such as staples. The gauge of the flat bar may be selected to accommodate the driving of the staples 19 there through, or may be thicker if the staples 19 are to be driven through the bags material, as shown in FIG. 2, with, in both embodiments, the staples 19 are bent into the bag neck 16a at the staple ends. Where the staples are driven through the bag frame, the load bearing capability of the bag is increased. That load bearing can be further increased with a use of a section of a J bar 26 for forming the bag frame 18, as shown in FIG. 7, that, like the flat bar 25, is bent into a rectangle and has its ends joined. In this arrangement, the J bar 27 J end is to point downwardly, and the staples are driven through the J bar 26 such that the J end supports the staples. Thereby, in practice, even with a collection of particles and resulting increase in load as is applied to the bag 16 neck 16a, that bag neck will not tear away from its coupling to the bag frame 18.

Figure 5:
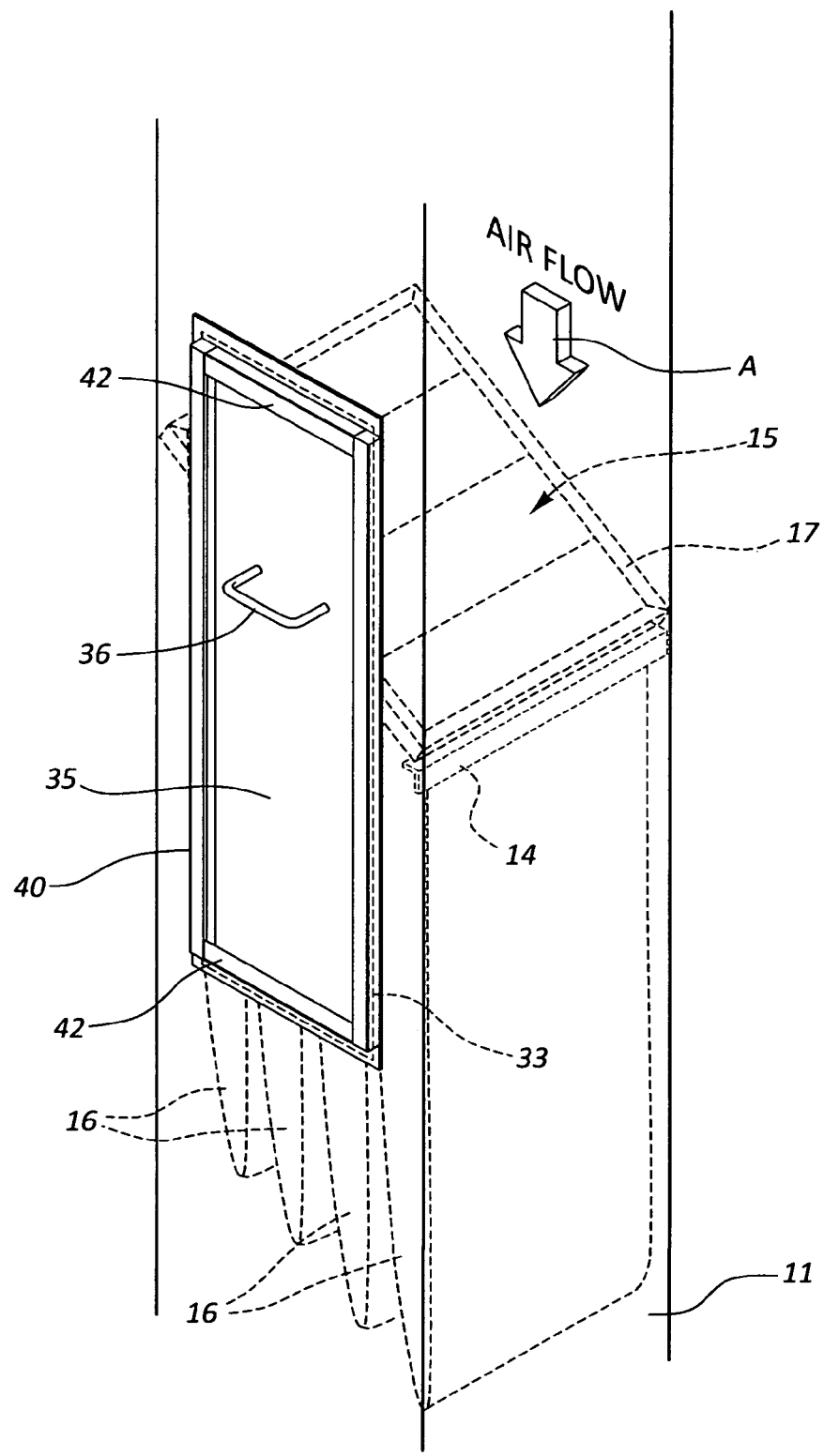
FIG. 5 shows a profile perspective section of a furnace return duct that has had a rectangular section removed therefrom that a door has been fitted over, and with arrows identified as Air Flow A shown as traveling in the return duct to travel through the filter element, shown in broken lines, installed therein.
Figure 10:
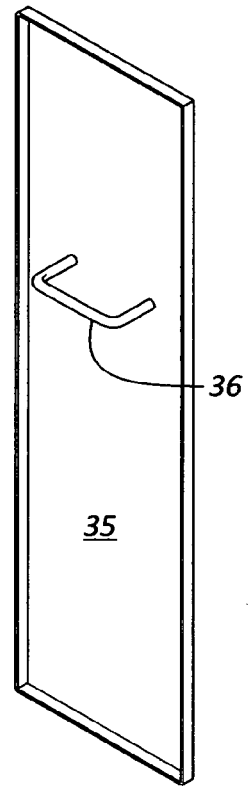
FIG. 10 shows a profile perspective view of a door for fitting into the door frame installed on the duct after the rectangular opening is cut into the duct.
Figure 8:
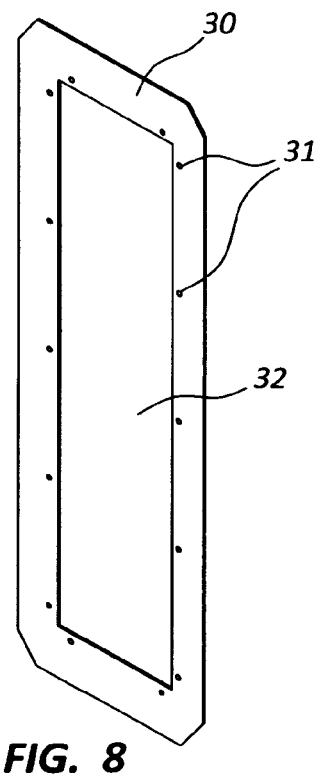
FIG. 8 shows a side elevation perspective view of a templet for forming the rectangular opening into the duct of FIG. 5.
Figure 11:
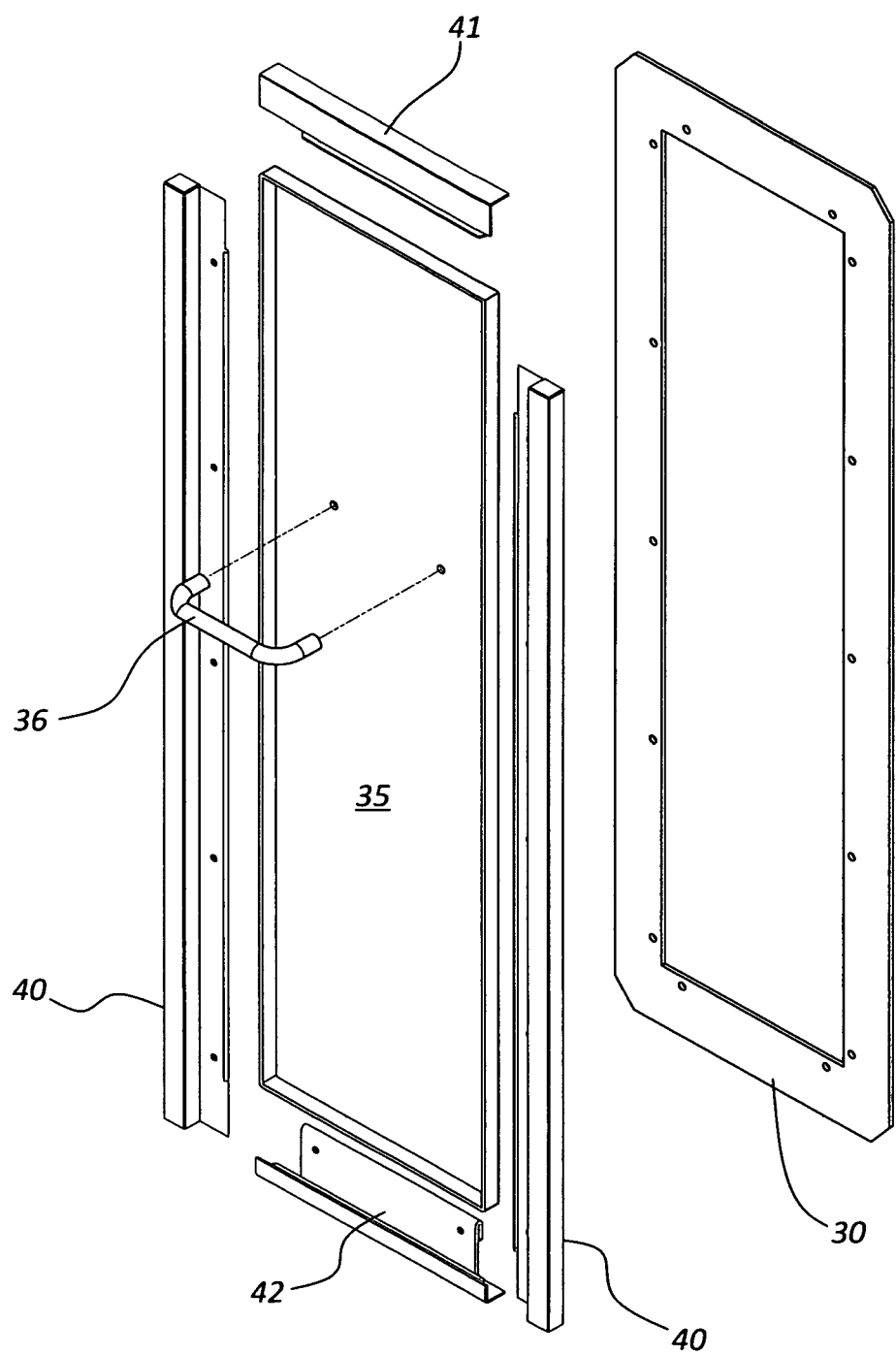
FIG. 11 shows an assembled exploded perspective view of the door, templet and rails of FIGS. 8, 9 and 10, and includes upper and lower horizontal door retaining rails.

The element frame 17 with the bags 16 mounted thereacross, as shown in FIG. 2, is for installation in the furnace return air duct 11, as shown in FIG. 1. To provide for this installation, the invention includes a templet, shown in FIG. 8, that is to be secured or taped to the front of the furnace return air duct 11, as shown in broken lines in FIG. 1. The templet 30 has holes 31 that an installer will drill through as pilot holes for securing the door frame 40 and 42 to the duct 11. The templet frame 30 includes a center rectangular opening 33 that an installer traces around with a marker and then cuts along to form the rectangular opening in the return air duct 11 after the templet is removed. The sides of the door frame 40 and the top and bottom door frames 41 and 42 respectively are fitted to the duct 11 and are secured with rivets to the duct 11. A door handle 36 is fitted to the door 35 with screws. FIG. 5, shows a door 35 that is for fitting thereover, as shown also in FIG. 10. Which door 35 includes the handle 36. For maintaining the door 35, as shown in FIGS. 5 and 10, rails 40, 41 and 42 are provided that are also shown in FIG. 11, that are for installation onto the duct 11, with holes 43 in which rails 40, and horizontal 41 and 42 are in alignment with the duct 11 holes 31 to receive rivets therethrough, maintaining the rails 40 in place, adjacent to the rectangular opening 33, as shown in FIG. 5. Shown in FIG. 5, the rails 40 support the door 35, and include horizontal rails 41 and 42 that are secured across the rails 40 upper and lowers ends that, respectively, the door 35 upper and lower ends will fit behind, for holding the door in position while allowing the door to be lifted and removed so as to allow access into the duct 11 through rectangular opening 33.

With the rectangular opening 32 cut through the duct 11 utilizing the templet frame 30, as shown in FIG. 1, an operator can install an element support 14 within the duct plenum area to extend across the duct wall, with that element support 14 to support the lower end of the element frame 17, with the upper end of the element frame to engage and rest against the opposite duct wall, maintaining the element frame 17 within the furnace plenum, as shown in FIGS. 1 and 5, such that the element frame 17 sides form an upward angle across the rectangular opening 33. Accordingly, the element frame 17 has to have a greater length than would be is required if the element frame was to be positioned at right angles across the duct inner walls. The longer element frame 17 therefore provides a maximum surface area over to accommodate a maximum number of bags, to provide a optimum collection surface area for the particular furnace duct. In practice, the element frame 17 length is limited by the duct interior dimensions and it selected to provide for proper bag 16 hanging where the bags will just rest against one another, without collapsing the bag sides. In practice, an angle of the element frame 17 of from thirty five to fifty degrees across the rectangular opening 32 has been found to be optimum.

For the element support 14 installation, an operator positions the element support 14 such that it is located a minimum of thirty-two inches above the opening to the air handler 10a. The element support 14 is installed by drilling through the support 14 and the duct wall 11 and securing the element support 14 with rivets. As needed, to provide sealing of the filter frame 17 ends onto the element support 14 surface, a seal strip 46 can be applied to the element frame end, and, as needed, to provide sealing of the filter frame sides to the duct walls and across the door 35 inner surface, a sealing strip 45 can be mounted along the element frame 18 sides, as shown in FIGS. 2 and 3. So arranged, the element frame 18 with the bag 16 folded thereagainst can be fitted through the duct opening 33 to where the filter frame end rests upon the filter support 14 top surface, with sealing strip 46 sealing the junction, and with the filter frame sides sealing strips 45 contacting the duct walls and door 35 inner surface, blocking an air flow around the filter frame 18.

While a preferred embodiment of a bag filtration element and system for its installation in a forced air furnace has been shown and described herein, it should, however, be understood that the present disclosure is made by way of example and that variations thereto are possible within the scope of this disclosure without departing from the subject matter coming within the scope of the following claims and a reasonable equivalency thereof, which claims I regard as my invention.

I claim:

1. A furnace bag filter element comprising, a flat rectangular element frame that is open at one end, will fit at an upward angle across a plenum of a furnace return air duct and has aligned opposing open sides that receive ends of flat rectangular bag frames that are open across their centers, and each said bag frame receives a neck of a filter bag fitted and secured thereto; a plurality of filter bags that are each open across their necks and are formed from an air filtration material; said bag frames and bags are fitted into said element frame such that said bag frames are side by side said element frame has a frame end secured across its open end; and said element frame is housed in a furnace return air duct that includes a rectangular opening of a size to allow for passage of said filter element into said duct and said return air duct includes an element support secured to a duct interior wall with one end of said filter element supported onto said element support and the other in engagement with a opposite duct interior wall to provide a slant to said filter element across said rectangular opening at an angle of from thirty five to fifty five degrees.

2. The furnace bag filter element as recited in claim 1, wherein the element frame is a straight metal channel that has been bent to form a U-shaped section, and said element frame is closed after the bag elements are fitted therein by bending said channel end to engage said metal channel opposite end; and said contacting channel ends are secured together.

3. The furnace bag filter element as recited in claim 2 wherein the bag frame is formed from a section of flat metal that is bent at interval and joined at its ends into a rectangle.

4. The furnace bag filter element as recited in claim 3, wherein the element frame and bag frames are each formed from galvanized steel.

5. The furnace bag filter element as recited in claim 4, wherein three or more filter bags and three or more bag frames are fitted side by side in the element frame; and said bags are each from twenty four to thirty six inches in length.

6. A furnace duct plenum bag air filtration system comprising, a bag filter element that has a rectangular element frame that individual rectangular bag frames are fitted to, and said bag frames each have a neck of a filter bag fitted and maintained thereto and which said bag necks are folded around sides of said bag frame and the folded bag neck surface are connected to one another; a rectangular opening is formed through a furnace return air duct, into the plenum area thereof to accommodate said element frame, bag frames and bags passed therethrough; and an element support that is of a length to extend across and is mounted to furnace duct wall inner surface to support one end of said element frame to engage and brace against a furnace duct opposite wall surface, said element frame forming an upward slant across said rectangular opening into said furnace duct at an angle of from thirty five to fifty five degrees between said opposite duct walls inner surfaces; and a cover is provided for fitting over said rectangular opening.

7. The furnace duct plenum bag air filtration system as recited in claim 6, wherein three or more filter bags and three or more bag frames are fitted side by side in the element frame; and said bag are each from twenty four to thirty six inches in length.

8. The furnace duct plenum bag air filtration system as recited in claim 6, wherein the element frame is formed from a straight metal channel that has been notched and is bent at said notches to form a U-shaped member and said element frame is closed after the bag frames are fitted therein by bending said straight metal channel end section to where an end thereof contacts said straight metal channel other end; and said straight metal channel ends are secured together.

9. The furnace duct plenum bag air filtration system as recited in claim 6, wherein the rectangular opening is formed through the furnace duct into the plenum; rails are secured to said duct outer surface around said rectangular opening; the cover is provided to fit within said rails; and horizontal bars are secured across said rails upper and lowers ends that upper and lower ends of said cover will fit behind.

* * * * *